United States Patent [19]

Sullivan

[11] Patent Number: 5,737,557
[45] Date of Patent: Apr. 7, 1998

[54] INTELLIGENT WINDOW USER INTERFACE FOR COMPUTERS

[75] Inventor: Gary Sullivan, Mansfield, Tex.

[73] Assignee: AST Research, Inc., Irvine, Calif.

[21] Appl. No.: 452,068

[22] Filed: May 26, 1995

[51] Int. Cl.$^6$ ................................................ G06F 3/100
[52] U.S. Cl. ................................... 395/340; 395/352
[58] Field of Search ............................... 395/157, 159, 395/161, 340, 348, 352, 326

[56] References Cited

PUBLICATIONS

Microsoft Windows 3.11 (Trademark of Microsoft Corporation) pp. 1993, screen displays 1–11.

Don Hopkins, "The Design and Implementation of Pie Menus", Dr. Dobbs Journal, Dec. 1991, pp. 16–26, 94.

*Primary Examiner*—Phu K. Nguyen
*Assistant Examiner*—Cliff N. Vo
*Attorney, Agent, or Firm*—Haynes and Boone, L.L.P.

[57] ABSTRACT

A system for implementing an intelligent window user interface for computers ("software suite") is disclosed. Each of a plurality of software suites of the present invention comprises a compound computer display object that provides a single integrated visual representation, via a "software suite window," for multiple application programs and/ or files, which are represented in the suite window by icons. Each software suite has associated therewith a storage element in which is stored contextual information for defining the appearance and behavior of the software suite window and the icons displayed therein and for identifying the locations of files associated with the icons. This contextual information may also include, for example, an order in which related files in the suite are to be executed, as well as file history and manufacturing information for the items represented in the suite. In one aspect of the invention, the system enables a user, with minimal input, to initiate certain operations simultaneously upon all of the files represented in the software suite. In another aspect of the invention, the system facilitates the execution of a variety of operations that apply to the collective properties of the set of items as a whole, rather than to each of the items individually. In still another aspect of the invention, the system facilitates the deinstallation of files represented by a particular suite window or icon.

36 Claims, 4 Drawing Sheets

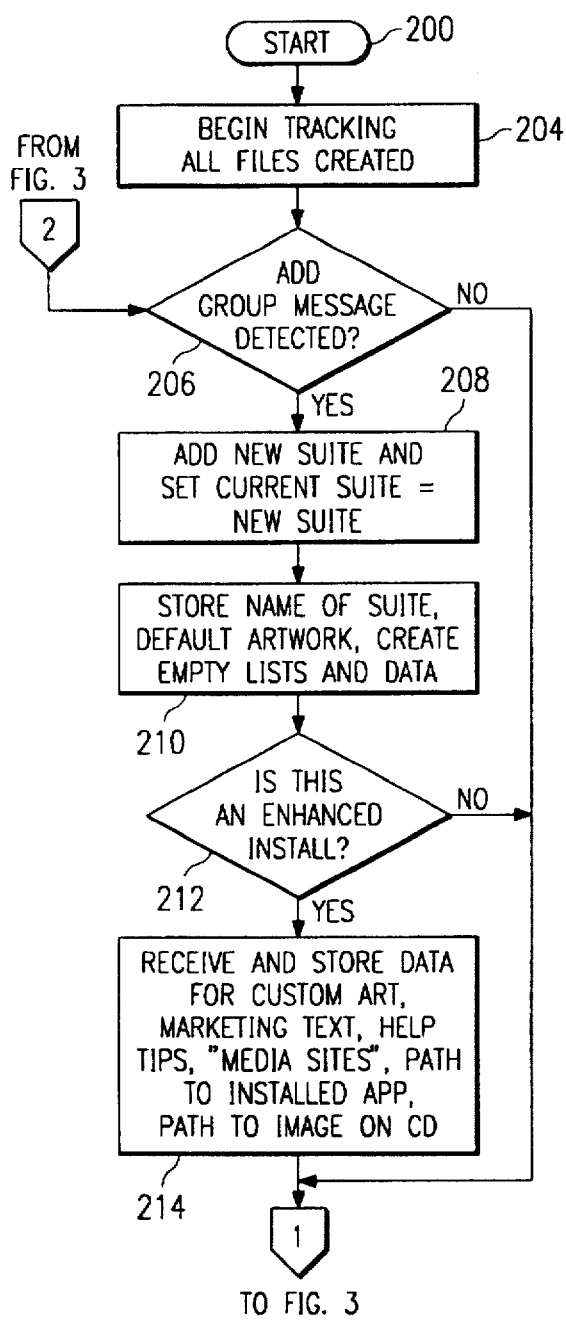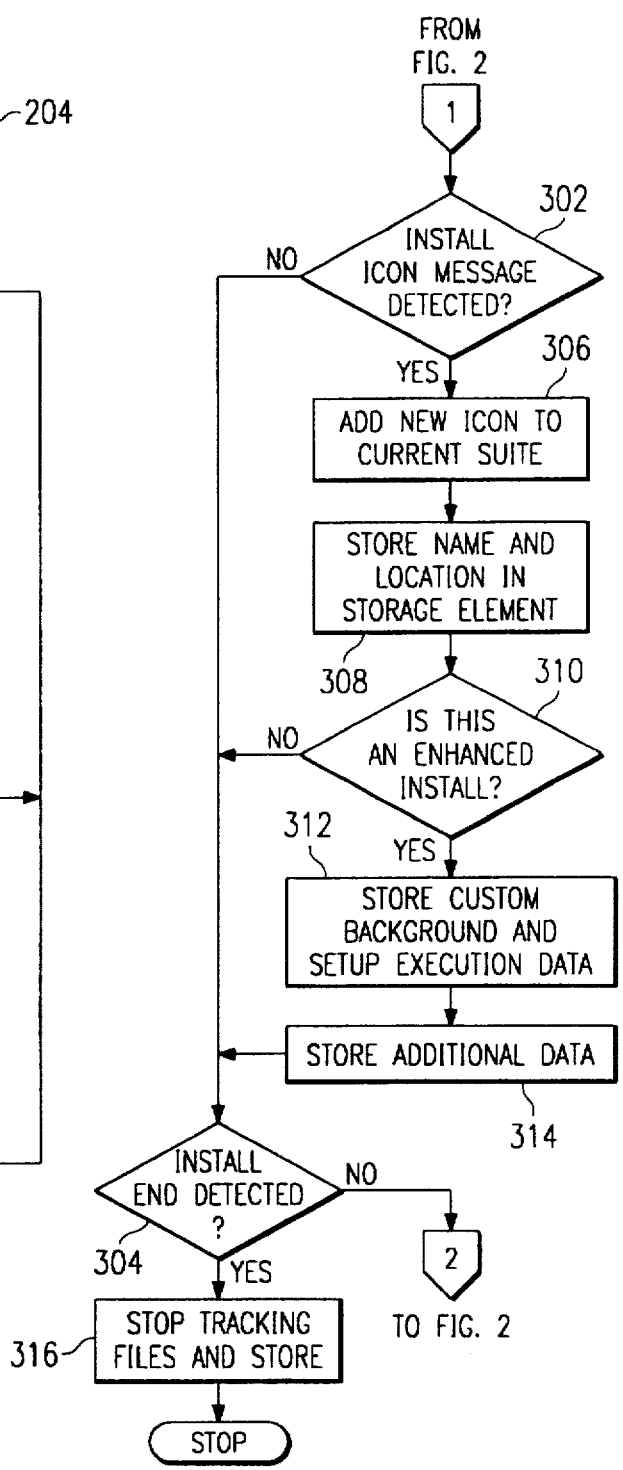

INTELLIGENT WINDOW USER INTERFACE FOR COMPUTERS

TECHNICAL FIELD

The invention relates generally to user interfaces for computers and, more particularly, to an intelligent window user interface for computers.

BACKGROUND OF THE INVENTION

Conventional computer systems, particularly personal computers, increasingly employ graphical user interfaces ("GUIs") which provide an intuitive interface to assist users in utilizing the system's functionality. One of the many advantages of GUIs is their ability to represent computer application programs, documents and data files as graphical display elements, or icons, as opposed to text-based elements, which may be executed or manipulated by a user, usually by means of a pointing device such as a mouse. A mouse is an input device which, when moved over a surface, moves a mouse pointer across the computer display in a manner corresponding to the physical movement of the mouse. Typically, a mouse has a number of buttons which when pressed generate to the computer an input instruction for the icon over which the mouse pointer is then positioned on the computer display. "Clicking" will be used herein to refer to the pressing and releasing of a mouse button. The Apple Macintosh user interface and the various versions of the Microsoft Windows operating environment, for example, Windows 3.1 and Windows 95, are common and very popular examples of GUIs, each illustrating the advantages a GUI has over conventional text-based user interfaces.

Another principal advantage GUIs have over text-based user interfaces is that the amount of information a user must recall in order to effectively use the computer is greatly reduced. For example, instead of having to remember the name of an application program and the location of the program on a particular disk and within a particular folder or directory, the user need only remember the appearance of the icon associated with the application. In order to further optimize the use of GUIs, most GUIs generate windows that serve as containers for groups of icons representing application programs and files. A user is able to group logically related icons into a single window, which permits the user to intuitively look to a particular window each time an application or file related to a given topic is desired. The group window may be further represented as an icon when "minimized" by a user.

GUIs typically represent application programs and other files as individual graphical display elements, such as icons or buttons, which serve to provide a visual representation of the application or file and which enable the user to perform certain actions, such as executing a application. These individual objects can be displayed in a single collection or they might also exist in groups that serve as containers that can be created, deleted, opened or closed, sized and arranged on a desktop. An example of the foregoing, is the "Groups" option in Microsoft Window's "Program Manager." However, the individual icons and groups enable the user to manage only the graphical display elements that represent the applications and files, not the applications and files themselves. Accordingly, if a user deletes an icon or group, the files they represent remain.

Both the Windows 95 and Macintosh GUIs include visual representations of subdirectories, for example, folders, which enable the direct manipulation of files and displaying of a group of files; however, the groups of files comprise merely a collection of individual files and the collection has no knowledge of the files comprising the collection. Therefore, no special actions, other than controlling the physical location of the files, can be taken with respect to the entire group of files, as opposed to the files individually.

This is insufficient for such operations as installation, since software installations usually place associated files in more than one subdirectory. Reinstallation by direct manipulation is impossible, because once the folder or files have been removed, they are no longer available to be manipulated. Moreover, in the case of Program Manager groups, there is no knowledge of special relationships among files within a group.

While GUI windows provide a convenient metaphor and storage container for icons related to programs and files, their functionality has been limited to purely serving as "dumb" icon containers. Apart from the location of the executable files related to program icons, these windows are unable to maintain any contextual information regarding the various application programs or files activated by the icons present in the window. For example, these windows are unable to maintain information on the order of execution of related files, file histories and file manufacturing information for update and other purposes, or other information related to a particular program or file. Further, current GUIs allow the user to manage only icons representative of files and not the files themselves. For example, if a user deletes an icon the files remain resident on the storage media, although the user may believe the files have been removed.

Additionally, current GUIs require all windows to have similar background appearances, and also impose size and dimensional limitations on icons displayed within a window. In order to provide added attraction and visual clues to emphasize certain windows and icons, it would be desirable to allow for variable window backgrounds and icon shapes and sizes.

Furthermore, when an application program is installed in a GUI window, the installation process typically requires the user to provide basic configuration parameters, such as the types and configurations of attached peripheral devices and printers, as well as individual program registration information. In order to assist end users in this task, computer manufacturers regularly preinstall, or "bundle," application programs in computer systems prior to their delivery to end users. While such preinstallation reduces end user start-up time, all initial setup programs are run before the system is finally assembled by the end user and often are installed before the actual end user is known. Accordingly, in order to obtain setup information required to effectively operate many bundled application programs, an end user must invoke a setup program independently of the installation process. One option is to require the program manufacturer to rewrite the program to force the end user to run the setup program prior to the first execution of the program. Unfortunately, this is can be an expensive procedure and manufacturers are reluctant to create different versions of their programs, one for end user installation and one for preinstallation by computer manufacturers.

Another disadvantage of current GUIs is observed in the deinstallation of programs. Frequently users desire, for space reasons or as a result of infrequent use, to deinstall a program from the system. After an application is deinstalled, all visual clues in the GUI are removed and the user must independently keep track of all deinstalled programs in his or her possession. Accordingly, users often fail to fully utilize the programs at their disposal because of the difficulties associated with keeping track of deinstalled programs.

Clearly, current GUIs have significant limitations. Accordingly, what is needed is an intelligent window user interface that is able to maintain contextual information regarding the various application programs or files stored in a window, provide for variable window and icon appearance, require setup programs to execute without modifying the application program, and assist the user in keeping track of de-installed programs.

SUMMARY OF THE INVENTION

The foregoing problems are solved and a technical advance is achieved by a system for implementing an intelligent window user interface for computers, hereinafter referred to as a software suite system. In a departure from the art, each of a plurality of software suites of the present invention comprises a compound computer display object that provides a single integrated visual representation, via a "software suite window," for multiple application programs, documents and/or data files (hereinafter collectively designated "items"), which are represented in the suite window by icons. In addition, a software suite window may contain iconized representations of other software suites.

In a preferred embodiment, each software suite has associated therewith a storage element in which is stored contextual information for defining the appearance and behavior of the software suite window and the icons displayed therein and for identifying the locations of files associated with the icons. This contextual information may also include, for example, an order in which related files in the suite are to be executed, as well as file history and manufacturing information for the items represented in the suite.

In one aspect of the invention, the system enables a user, with minimal input, to initiate certain operations simultaneously upon all of the items represented in the software suite. In particular, the system enables a user to delete, move and/or copy some or all of the icons, along with the items represented by same. In another aspect of the invention, the system facilitates the execution of a variety of operations that apply to the collective properties of the set of items as a whole, rather than to each of the items individually. In particular, where an integrated software product is embodied in a particular software suite, the user can display the directory into which the software product has been installed, the name of and general information concerning the software product, and a list of all files installed when the software product was installed, regardless of their location, and can deinstall or reinstall the entire software product with minimal effort.

In another aspect of the invention, the system facilitates the deinstallation of files represented by a particular suite window or icon. In addition, when a file is deinstalled, the user may choose for the appearance of the window or icon representing the file to deemphasized, or "grayed," to indicate to the user that the window or icon has been deinstalled, thus facilitating the reinstallation of windows and icons that have been deinstalled in the above manner. Alternatively, the window or icon and the file(s) it represents may be deleted altogether, in which case the represented file(s) will also be deleted. In yet another aspect of the invention, the user may copy or move icons between software suites or to a location external to the system of the present invention, for example, a desktop, while maintaining with the icon(s) all contextual information stored relative to that icon.

A technical advantage achieved with the invention is that it enables contextual information regarding the items stored in the same software suite to be maintained with the suite. In addition, the software suite stores information that pertains to the group of items and that exceeds information merely describing the location of individual items in the suite.

A further technical advantage achieved with the invention is that it supports variable suite window and icon sizes and appearances. In this manner, certain utilities, such as setup or help utilities, can be visually distinguished from the remaining items in the suite, thereby drawing the user's attention to those utilities. Additionally, the relative significance of items in the suite can be visually indicated using icons of different sizes, shapes and colors.

A further technical advantage achieved with the invention is that it can enforce a requirement that a setup utility be executed prior to execution of another application program without necessitating the modification of the application program to do so.

Yet another technical advantage achieved with the invention is that it enables users to keep track of deinstalled items and to easily reinstall items by "graying" icons and windows representing items that have been previously deinstalled.

Yet another technical advantage achieved with the invention is that it enables a user to conceptualize and manage a collection of items as a single title, thereby simplifying the user's mental model of the system.

Still another technical advantage achieved with the invention is that, because contextual information for all the items in the suite is stored with the suite, the suite can cause a support program automatically to be executed simultaneously with other applications in the suite that rely on the functionality of that support program.

BRIEF DESCRIPTION OF THE DRAWINGS

FIG. 2 is a flowchart illustrating a preferred method of the present invention for installing a software suite.

FIG. 3 is a flowchart illustrating a preferred method of the present invention for installing an icon within a software suite.

DESCRIPTION OF THE PREFERRED EMBODIMENTS

As used herein, the term "software suite" refers to a compound computer display object that provides a single integrated visual representation of multiple application programs or files, hereinafter collectively referred to as "items."

Figure 1A:
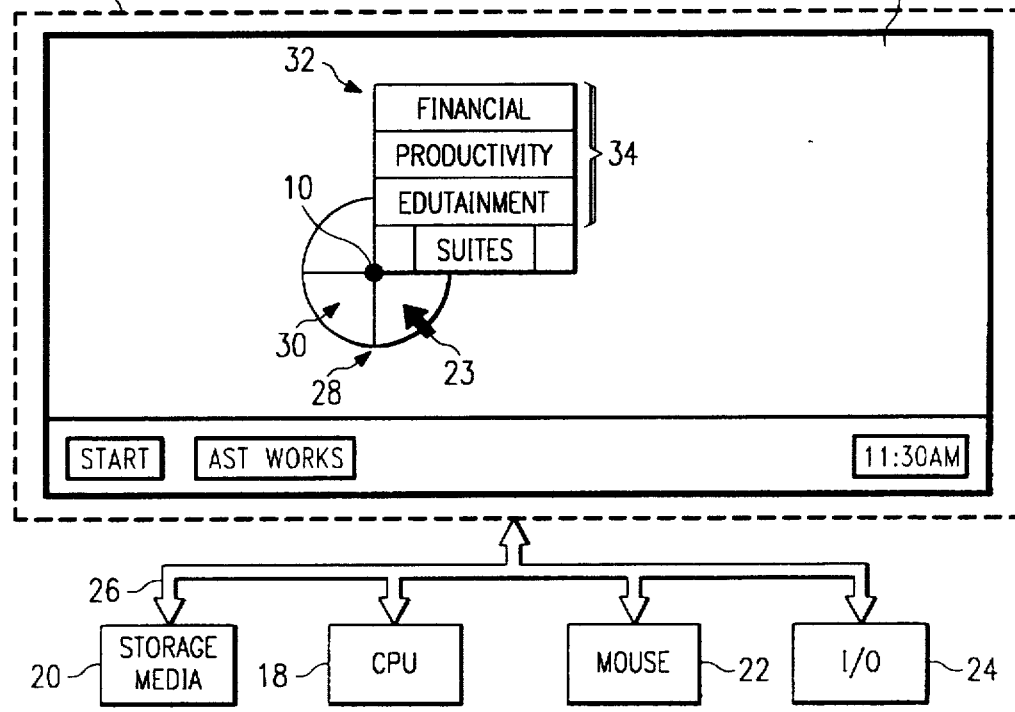
FIG. 1A illustrates a computer system for implementing software suites embodying features of the present invention.

FIG. 1A illustrates one method by which a software suite of the present invention may be accessed. Referring to FIG. 1A, in the preferred embodiment, a sphere-shaped graphical display element ("GDE"), hereinafter referred to as a "spot interface," is designated by a reference numeral 10. The spot interface 10 is shown as being overlaid on a desktop 12 of a graphical user interface (GUI). In the illustrated embodiment, the desktop 12 represents the desktop view of the Microsoft Corporation's Windows 95 GUI operating system, although it is anticipated that the software suites system of the present invention may be implemented in any number of different GUI operating systems and environments. It is understood that the spot interface 10 and desktop 12 are generated by a computer 14 comprising a display 16, a central processing unit (CPU) 18, storage media 20, a mouse input device 22 for manipulating a mouse pointer 23 and other input/output ("I/O") devices 24, including a keyboard, interconnected in a conventional manner via a bus 26. As used herein, the term "storage media" is intended to comprise any number and combination of electronic storage devices, for example, RAM, ROM, CD-ROM and hard disk drives.

As more fully described in commonly-owned copending U.S. patent application Ser. No. 08/431,280 (Atty. Docket No. 17705.53), filed Apr. 28, 1995, the disclosure of which is hereby incorporated by reference in its entirety, the spot interface 10 is designed to float on top of the desktop 12 and all open windows without obstructing much, if any, of the information displayed thereon. Placement of the mouse pointer 23 over the spot interface 10 results in the display of a collar 28 encircling the spot interface 10. When first displayed, the collar 28 comprises four quadrants, such as the quadrant 30, each of which correspond to a secondary interface. Movement of the mouse pointer 23 into one of the quadrants results in the immediate display of the corresponding secondary interface.

In particular, as shown in FIG. 1A, one of the quadrants of the collar 28 corresponds to a secondary interface 32, designated "SUITES." In accordance with a feature of the present invention, the SUITES interface 32 comprises a plurality of access buttons 34, each of which corresponds to an individual software suite, such that selection of one of the access buttons 34 opens, or launches, the corresponding software suite, as described in detail below with reference to FIG. 4. In this regard, although the interface 32 is shown in FIG. 1A as comprising three access buttons 34, respectively designated "FINANCIAL," "PRODUCTIVITY," and "EDUTAINMENT," it should be understood that any number of access buttons 34 may be included in the interface 32 for accessing a corresponding number of available software suites.

Figure 1B:
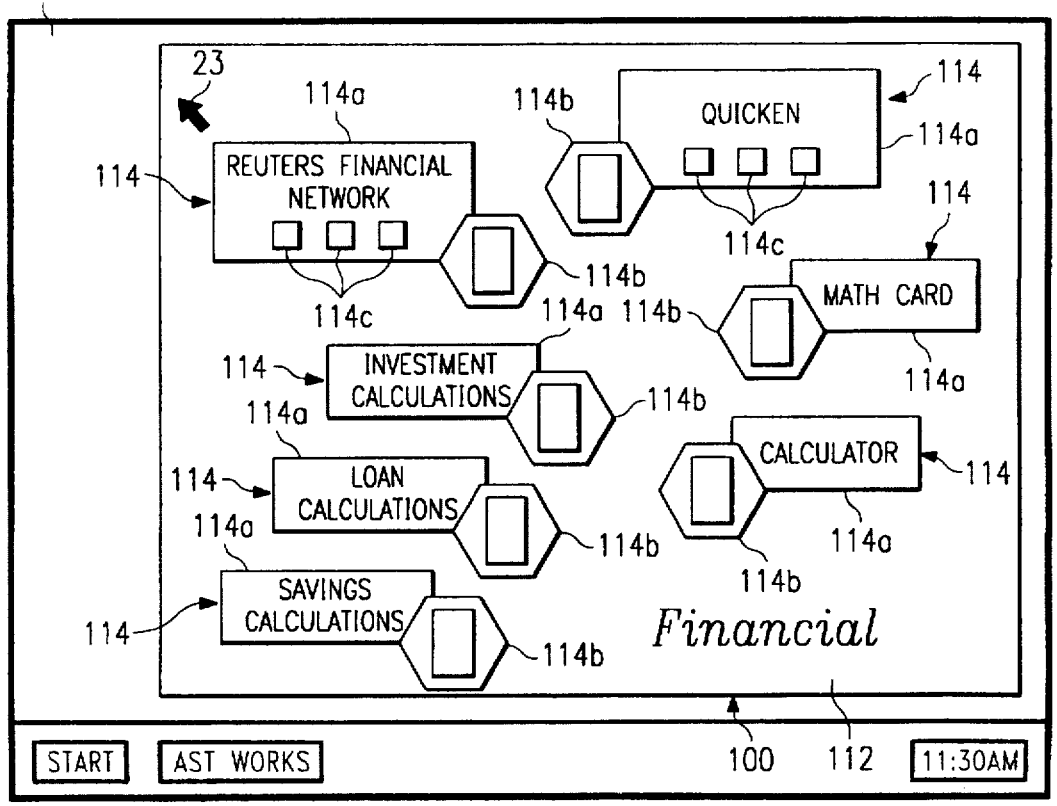
FIG. 1B illustrates an exemplary software suite embodying features of the present invention.

Selection of the FINANCIAL access button from the interface 32 launches a FINANCIAL software suite, as shown in FIG. 1B and designated by a reference numeral 100. Referring now to FIG. 1B, the composition of a software suite will be described with reference to the FINANCIAL software suite 100, it being understood that all software suites of the present invention will share the common features described below with reference to the suite 100. As shown in FIG. 1B, the software suite 100 comprises a suite window 112, which overlays the desktop 12, on which a plurality of icons 114 are displayed. In the preferred embodiment, each of the icons 114 represent an item comprising the software suite 100 or comprise an iconized representation of another software suite. As shown in FIG. 1B, each of the icons 114 comprise a background portion 114a and a button 114b, the selection of which opens the file or document or executes the program represented by the button 114b.

It is contemplated that the background appearance of the suite window 112 of each suite, such as the suite 100, is preferably customizable to provide an attractive visual indication of the type of items included in the suite. For example, as shown in FIG. 1B, it is anticipated that each suite window may include the name of the suite, e.g., "FINANCIAL," written in an attractive script across the suite window. Moreover, although all the icons 114 are shown in FIG. 1B as having similar dimensions and shapes, in an alternative embodiment, the dimensions of the icons 114, as well as the appearance of the backgrounds 114a thereof, may be variable, thereby enabling the manufacturer or user of the computer 14 to increase the visual appeal of icons representative of relatively more significant items in the suite, as well as to draw the user's attention to certain items, particularly setup programs, that should be executed first.

Some of the icons 114 may include on the background 114a thereof multiple secondary buttons 114c that, when activated, enable the user to activate specific subapplications that do not require full invocation of the underlying application. Moreover, additional information common to multiple items in the suite, such as help files or marketing information on the product (hereinafter "media sites"), may be displayed to the user responsive to the user's resting of the mouse pointer 23 over one of the icons 114 for a predetermined period of time.

In order to implement the additional functionality enabled by the present invention, a storage element for each software suite is created in the storage media 20 upon installation of the suite for storing contextual information identifying the items included in the suite and defining the appearance and behavior of the suite and its icons. Installation of suites and their icons are described in further detail with reference to FIGS. 2 and 3.

A unique feature of the present invention is that each software suite's storage element stores contextual information that describes an integrated software product or other related group of items included in the suite and, as such, the information stored in the suite's storage element exceeds information that merely describes the individual files represented in the suite. Such contextual information may include, for example, the identity and location of all component files of an installed software product, other information that describes the status or history of the software product's installation or manufacture; special status of individual component files within the product, e.g., setup programs, tutorials, product registration utilities; and special requirements or relationships that require a certain order of program execution or the running of support programs. Different kinds of files or other properties can be represented by icon assignments based on specially configured knowledge of the type, purpose or special status of a file, and not limited to the icon(s) stored within the file or a simple icon assignment based on the file extension.

The information stored in the storage element also preferably includes information gathered at the time of installation or manufacture that would support clean deinstallation of the product without affecting other installed software or user data files. This information, along with the fact that there is a persistent visual representation of the product or group, enables both deinstallation and reinstallation procedures, as will be described, to be performed responsive to minimal user input and further enables user input to be applied to the graphic representation the group of items, i.e., the icon(s) and or software suite without requiring knowledge on the part of the user of individual files and storage locations and without requiring the use of external deinstallation/reinstallation utility programs.

In this regard, as will also be described, the system of the present invention enables a user, with a single action, to perform certain operations simultaneously upon all of the items represented within the software suite. Such actions can include removing all of the icons and deleting all of the applications and files they represent and moving or copying all of the icons and the applications and files they represent to another software suite or to a location outside the software suites system, e.g. the desktop 12.

Moreover, the system enables certain operations that apply to the collective properties of all of the items in a suite, and not to the individual items contained within it. This is especially useful in cases where the icons in a software suite represent different components of an integrated software product. Such actions include displaying the directory in which the software product has been installed; displaying the name of the software product and general product information; displaying a list of all files installed when the software product was installed, regardless of their location; and deinstalling and reinstalling a software product.

Finally, the system of the present invention includes method by which the user can select or specify one or more individual icons in order to effect some action on the individual icon(s) and the item(s) it represents. These actions include, for example deleting the icon and the item it represents, moving or copying the icon and the item it represents to another location, placing the icon and the item it represents on the GUI clipboard, running the executable program assigned to the icon; and displaying special information or any special status of the item, such as setup program, multimedia content, main executable, help file, etc.

FIG. 2 is a flowchart of the method of installing a software suite in accordance with the above-described features of the present invention. Execution begins in step 200 responsive to a user's initiating an installation procedure in the manner provided by the particular operating system. In step 204, a record of all files created during the installation is begun. It is understood that the record of all created files ceases upon conclusion of the installation.

Execution then proceeds to step 206, in which a determination is made whether an "add group" message is detected. For example, in the Windows Program Manager, an "add group" message is generated responsive to a user's entering a group description file in a Program Group Properties dialog box. If in step 206 it is determined that an add group message has not been detected, execution proceeds to step 302 (FIG. 3). If in step 206 it is determined that an add group message has been detected, execution proceeds to step 208, in which a new software suite is created, and then execution proceeds to step 210. In step 210 a storage element for storing information generated during installation is created and the name of the software suite and standard artwork for the background appearance of the software suite window is stored therein. Upon conclusion of step 210 execution proceeds to step 212. In step 212 it is determined whether the group of application programs being installed as a software suite have been written to support customized backgrounds, variable icon size and shape, and the like and otherwise to support the enhanced functionality of the software suites system of the present invention. If not, execution proceeds to step 302 (FIG. 3); otherwise, execution proceeds to step 214. In this manner, the system of the present invention may be used with applications program specially designed to maximize the functionality of the present invention, as well as application programs which are written without knowledge of same.

In step 214, data describing the custom background art of the software suite, any information related to marketing material, help tips, file and manufacture history, the location of the installed applications, and the path to an image of the installed group of applications resident on a CD-ROM are stored in the storage element of the software suite. It is understood that a wealth of information regarding the suite and its applications can be stored for presentation to and/or by the user. For example, such information could be continually displayed in text form on the corresponding suite window or could be displayed responsive to the mouse cursor being positioned over an icon for a predetermined period of time.

As previously indicated, not all groups of application programs installed on the computer 14 support the enhanced functionality (e.g., customized background and icon appearances) enabled by the system of the present invention. Accordingly, if the current group of application programs does not include customized suite window background appearance, the default artwork stored in step 210 will be utilized to represent the suite window. Upon completion of installation in step 214, execution proceeds to step 302 in FIG. 3.

FIG. 3 is a flowchart of the method of installing an icon in a software suite in accordance with the above-described features of the present invention. Execution of this portion of the installation process begins in step 302, in which a determination is made whether an install icon message is detected. For example, in Windows Program Manager, such a message is generated responsive to a user's entering the designated information in a Program Item Properties dialog box. If in step 302 it is determined that an install icon message has not been detected, execution proceeds to step 304 to determine whether an installation end has been detected. If in step 302 a determination is made that an install icon message has been detected, execution proceeds to step 306.

In step 306 a new icon is added to the storage element of the current software suite, and execution proceeds to step 308. In step 308 the name and location of the item(s) with which the created icon is associated are added to the software suite's storage element to permit execution of the appropriate action required upon activation of the icon. Execution then proceeds to step 310, in which it is determined whether the icon being installed supports the system's enhanced functionality, e.g., customized icon appearance. If not, execution proceeds to step 304; otherwise, execution proceeds to step 312. In step 312 data describing the custom background a of the icon is stored in the storage element for the software suite. Also in step 312, an execution list for any required setup programs, or programs that must be executed to activate the icon, is stored in the storage element. Execution then proceeds to step 314, in which any additional information required for operation of the installed icon, such as marketing material, help tips, file and manufacture history, is added to the software suite's storage element.

Execution then proceeds to step 304, in which a determination is made whether an installation end has been detected. If an installation end has not been detected in step 304, then execution returns to step 206 and installation of any additional groups or individual icons are processed as described above. If an installation end has been detected in step 304, then execution proceeds to step 316. In step 316 the record of all files created during the installation process begun in step 204 is stopped and the created record is stored in the storage element for the software suite.

Figure 4:
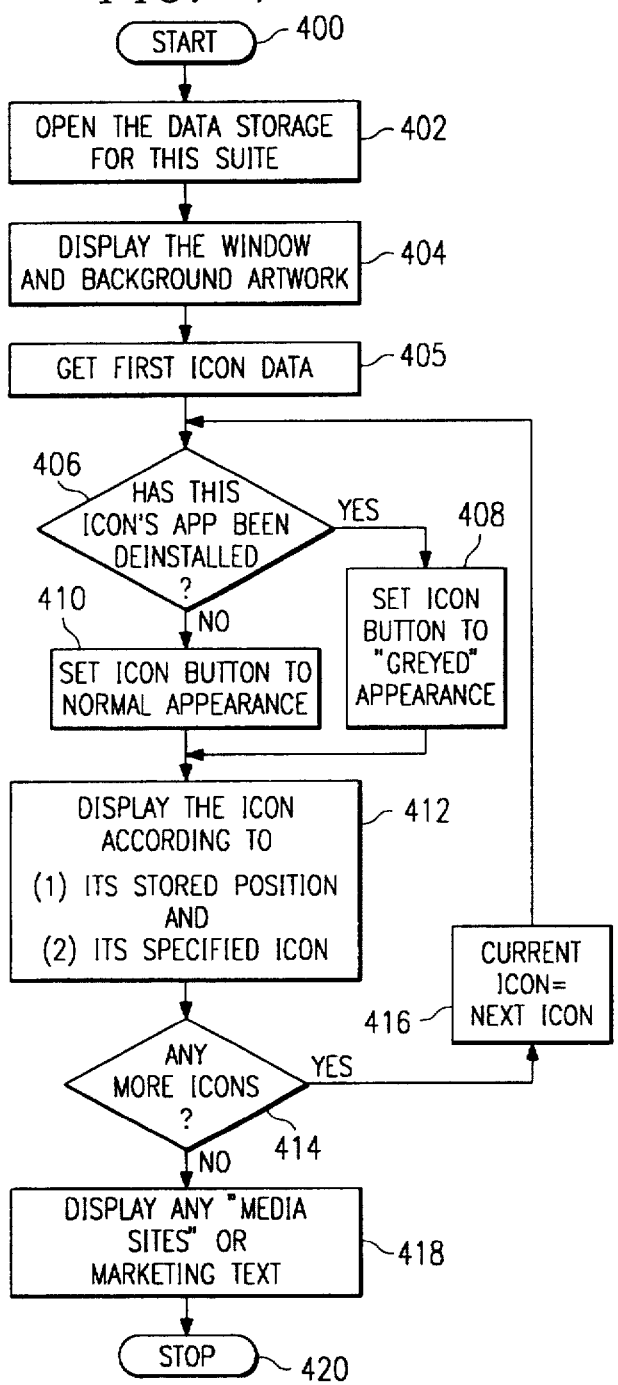
FIG. 4 is a flowchart illustrating a preferred method of the present invention for displaying a software suite and item icon.

FIG. 4 is a flowchart of the method of displaying a software suite window and its icons in accordance with the above-described features of the present invention. Execution begins in step 400 responsive to user-selection of an access button of the secondary interface 32 (FIG. 1A) associated with a suite. In step 402 the data storage element for the selected software suite is opened and execution proceeds to step 404. In step 404 the data storage element for the software suite is processed and the software suite window with its associated background, stored in step 210 or 214 (FIG. 2), is displayed on the desktop 12. Execution proceeds to step 405, in which data for the first icon to be displayed on the background is accessed, and then to step 406, in which it is determined whether the item associated with the current icon has been deinstalled. Deinstallation is described in detail below with reference to FIG. 6.

If it is determined in step 406 that the current icon's item has been deinstalled, then execution proceeds to step 408, in which the appearance of the icon is altered, generally to deemphasize, or "grey", the appearance of the icon to enable the user to easily identify items that were once installed, but have since been deinstalled, and also to distinguish between such installed and deinstalled items. If it is determined in step 406 that the current icon's item has not been deinstalled, then execution proceeds to step 410, in which the icon's normal appearance is retained. Following execution of both steps 408 and 410, execution proceeds to step 412, in which the current icon 114 is displayed on the software suite 10. In step 412 the storage element is processed to determine the dimensions, placement and appearance of the current icon. The icon is then displayed on the software suite's background according to the information provided in the software suite's storage element.

Execution then proceeds to step 414, in which it is determined whether any additional icons are to be displayed. If it is determined in step 414 that additional icons are to be displayed, then execution proceeds to step 416, in which the next icon is selected and execution returns to step 406. If it is determined in step 414 that all icons have been displayed, execution proceeds to step 418, in which any additional information, such as media sites and help information, stored in the storage element in connection with the suite is processed, after which execution terminates in step 420.

Figure 5:
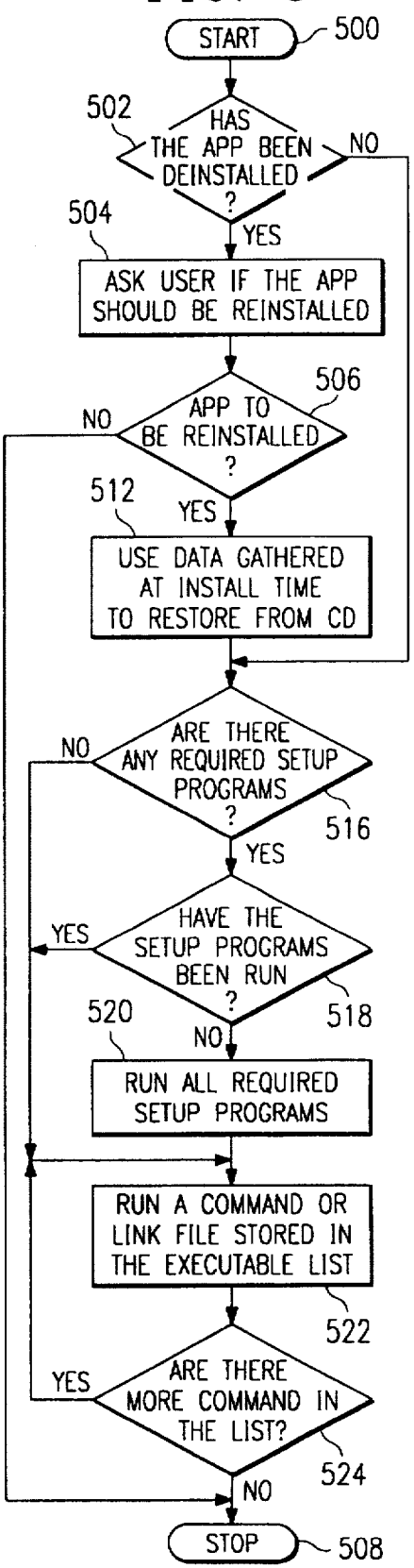
FIG. 5 is a flowchart illustrating a preferred method of the present invention for deleting an item from a software suite or an entire software suite.

FIG. 5 illustrates a flowchart of the method of activating an icon installed within a software suite of the present invention. Activation of an icon in a software suite also utilizes the information stored in the storage element. Execution begins in step 500 upon a user's selecting an icon and issuing any activation command. It should be understood that an activation command is typically performed by placing the mouse pointer 23 over an icon and clicking on the icon; however, an activation command could be issued by any standard means supported by the GUI in which the system is operating.

In step 502 it is first determined whether the item represented by the icon, for example, an application, has been deinstalled, as will be described in connection with FIG. 6. If it is determined that the application was deinstalled, execution proceeds to step 504. In step 504, the user is asked whether the deinstalled application should be reinstalled. If it is determined in step 506 that the user has elected not to reinstall the application, execution terminates in step 508. If it is determined in step 506 that the user has elected to reinstall the application, execution proceeds to step 512, in which the suite's storage element is processed and the application is reinstalled pursuant to the information retained in the storage element, generally by accessing a copy of the application from a CD-ROM or other storage media.

If the application represented by the icon has not been deinstalled, as determined in step 502, or the application has been reinstalled via step 512, then execution proceeds to step 516. In step 516 a determination is made whether any setup programs must be executed. This determination is made by processing the execution list stored in the software suite's storage element in step 312 (FIG. 3). If it is determined in step 516 that a setup program must be run, execution continues to step 518. In step 518 a determination is made whether the setup program has previously been executed. If not, execution proceeds to step 520, in which all setup programs listed in the software suite's storage element related to the selected icon are executed and a command is stored in the storage element to indicate that the setup programs have been executed. By allowing setup programs to be selectively executed, by processing the information stored in the storage element upon activating an icon, the application code itself need not be modified to require the execution of the setup program code, thus assisting with the setup of programs preinstalled by the manufacturer.

If it is determined in step 516 that no setup programs must be run, or it is determined in step 518 or 520 that the setup programs have already been run, execution proceeds to step 522. In step 522 the software suite's storage element is processed for the execution commands to invoke execution of the application represented by the activated icon. The first command is executed and execution proceeds to step 524. If it is determined in step 524 that additional execution command must be run then execution returns to step 522 and the process repeats until all commands related to the activated icon have been processed. By allowing for multiple commands to be executed, the software suite can automatically invoke other applications that are required in connection with the program related to the activated icon. Once it is determined in step 524 that all commands have been executed then execution stops.

Figure 6:
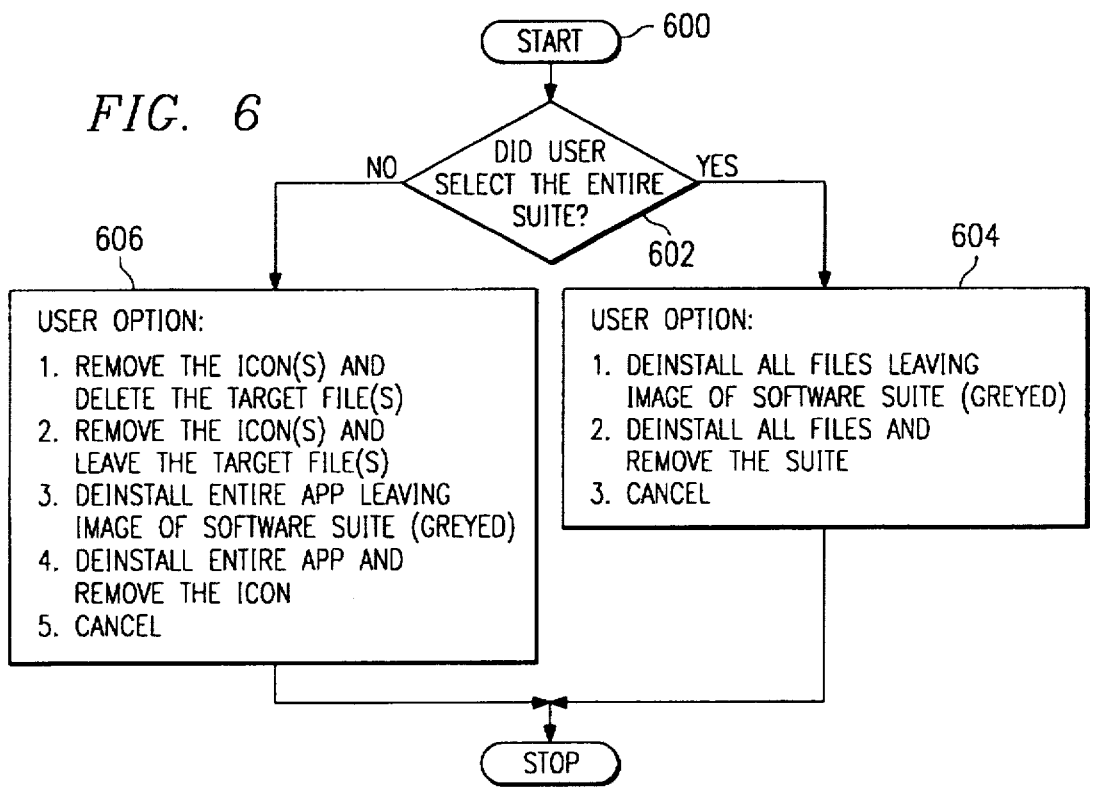
FIG. 6 is a flowchart illustrating a preferred method of the present invention for moving or copying an item icon from a software suite or an software suite.

FIG. 6 is a flowchart of the method of deleting an icon from a software suite or an entire suite of icons, including the items represented thereby, in accordance with the above-described features of the present invention. In order to enable a user to track deinstalled items, as described below, the software suite allows the user to deemphasize an icon representing a deinstalled application. Execution begins in step 600 upon a user's selecting at least one icon or software suite and issuing a delete command. It is understood that a delete command could be issued in any manner supported by the GUI in which the suite is operating.

In step 602 a determination is made whether the user has selected an entire software suite or at least one icon for deletion. If it is determined in step 602 that the user has selected an entire software suite for deletion then execution proceeds to step 604. Upon execution of step 604, the user is given various options to select the manner in which the software suite will be deleted. For example, the user may elect to deinstall the entire suite while leaving an altered, non-functional, representation of the suite for display, in which case the record of all installed files stored in the software suite storage element, which began at step 204 in FIG. 2 and concluded in step 314 in FIG. 3, would be utilized to indicate the installed files to be deleted from the storage media 20. The software suite storage element would then be modified to indicate that the software suite was deinstalled, and the software suite would be redisplayed to deemphasize (i.e., "gray") the suite by repeating the display process illustrated in FIG. 4. The user could similarly choose to deinstall the software suite and completely remove the suite from the display. In this instance, all files recorded in the storage element would be deleted and the software suite itself would be deleted.

If it is determined in step 602 that the user has not selected an entire software suite for deletion then execution proceeds to step 606. Upon execution of step 606 the user is given various options to select the manner in which the icon and the item it represents will be deleted. For example, the user may elect to completely remove the icon and delete the target files of the item represented by the icon. In this process the software suite, based on the data stored in the storage element, would delete the file or files that are executed by a users's activating the icon, and then the icon itself is deleted. The user could also elect to merely remove the icon and leave the associated files in the storage media 20. In this case, the icon would be deleted from the software suite's list of icons stored in the storage element. The user could also elect to deinstall the entire application while leaving an altered, non-functional, representation of the icon for display, in which case the record of all installed files stored in the software suite storage element and related to the icon would be utilized to indicate the installed files to be deleted from the storage media 20. The software suite storage element would then be modified to indicate that the icon's item was deinstalled and the icon would be redisplayed to deemphasize the icon by repeating the display process described in FIG. 4. The deinstalled application could thus be reinstalled according to the information retained in the storage element in the manner described in connection with FIG. 5. The user could similarly choose to deinstall the application and remove the icon from the display. In this instance all files recorded in the storage element that are associated with the icon would be deleted and the icon itself would be deleted.

Figure 7:
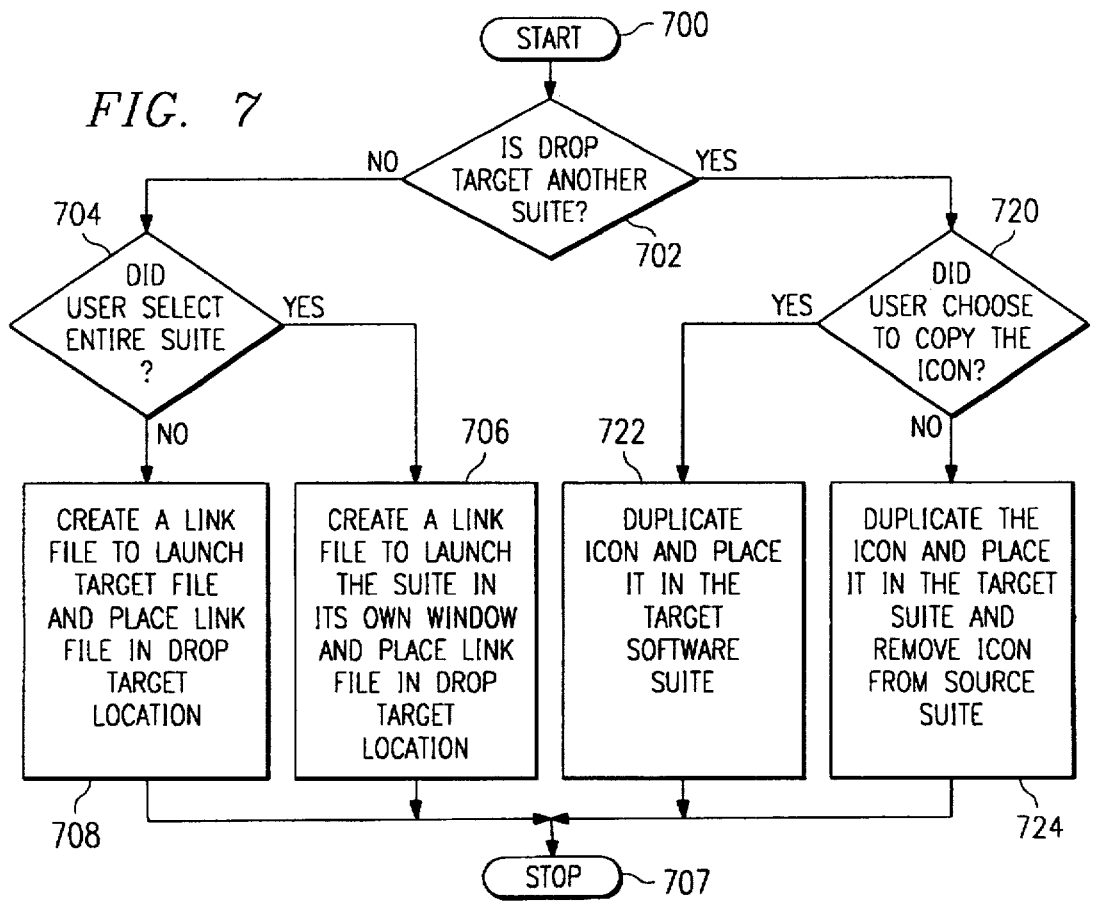
FIG. 7 is a flowchart illustrating a preferred method of the present invention for activating an item icon installed within a software suite.

FIG. 7 illustrates a flowchart of the method of moving or copying a software suite or icon from a software suite of the present invention. In order to provide for the functionality allowed by the present invention, the related storage elements must be modified upon a move or copy operation. Execution begins in step 700 upon a user selecting at least one icon or software suite and issuing an appropriate move or copy command, which may be issued in any manner supported by the GUI in which the software suite is operating.

In step 702 a determination is made whether the destination target for the selected icon or software suite is another software suite or a location outside the software suites system, e.g., the desktop 12. If it is determined in step 702 that the target location is not another software suite then execution proceeds to step 704. In step 704 it is determined whether the user selected the entire software suite. If the entire software suite was selected then execution proceeds to step 706. If it is determined that the entire software suite was not selected then execution proceeds to step 708. If it was determined in step 704 that the user selected the entire suite, in step 706 a link file is created that will launch the suite in its own window and the link is placed in the external drop target location and execution terminates in step 707. If it was determined in step 704 that the user did not select an entire suite, then, in step 708, a link file is created that will launch the target file and this link is placed in the external drop target location and execution terminates in step 707.

If it is determined in step 702 that the target location is another software suite then execution proceeds to step 712. In step 720 a determination is made whether the user elected to copy or move the icon. If it is determined that the user selected to copy the icon then execution proceeds to step 722. In step 722 the icon is copied to the target suite and the information stored in the suite's storage element relating to the icon and its associated item are copied into the target suite's storage element, and execution terminates in-step 707. If it is determined in step 720 that the user elected to move the icon then execution proceeds to step 724. In step 724 the icon is copied to the target suite and the information stored in the suite's storage element relating to the icon and its associated item are copied into the target suite's storage element, and then the original icon is deleted. Execution then terminates in step 707.

In the above-described manner, the system of the present invention enhances the functionality of a GUI by enabling the user to conceptualize, operate and manage a suite of items as a single entity, rather than a collection of individual, unrelated items, and by encouraging or requiring the user to run preferred programs or to run programs in a preferred or required order. In addition, because of the type of information stored in the suite's storage element, which includes the names and locations of all of the component files of a software product and other data that describes the status or history of the product's installation, the user can deinstall or reinstall the product by applying a function to the graphical representation thereof. Likewise, an attempt by the user to delete the suite or any or all of its items can be interpreted as a request to deinstall the product.

It is understood that the present invention can take many forms and embodiments, the embodiments shown herein are intended to illustrate rather than limit, the invention, it being understood that variations may be made without departing from the spirit of the scope of the invention. For example, the software suite need not permit all of the variations suggested herein, and any additional information may be stored and accessed from the storage element by a user or other application program. The software suite need not necessarily operate within Windows operating environments and may instead be operated in other GUI environments. In addition, where the icons 114 represent iconized software suites, such software suites can be displayed in an "open" state, in which both the background 114a and the button 114b are visible on the suite window 112, or in a "closed" state, in which only the button 114b is visible until the suite is opened by resting the mouse pointer on the button 114b, in which case, unless the suite is "locked" open, the suite will return to the closed state once the mouse pointer 23 is moved from the icon 114. Accordingly, it is appropriate that the appended claims be construed broadly and in a manner consistent with the scope of the invention.

What is claimed is:

1. A method of operating a computer comprising a graphical user interface (GUI) and a display, the method comprising:

installing on said computer a plurality of related items comprising data files and application programs, said installed items collectively comprising a suite;

storing in a storage element associated with said suite contextual information relating to said installed items individually and collectively, said contextual information comprising information for identifying a location of each of said files and defining a relationship among said items;

responsive to user selection of a graphical display element (GDE) associated with said suite, displaying on said display a window for representing said suite, wherein each of said installed items is represented in said window by an icon; and responsive to receipt of a command in connection with at least one of said icons, performing an action identified by said command on each of said at least one of said icons and said installed item represented thereby.

2. The method of claim 1 wherein said command comprises a move command and said performing comprises moving each of said at least one of said icons and said item represented thereby to a location in said GUI designated by said user.

3. The method of claim 1 wherein said command comprises a copy command and said performing comprises copying each of said at least one of said icons and said item represented thereby to a location in said GUI designated by said user.

4. The method of claim 1 wherein said command comprises a delete command and said performing comprises deleting each of said at least one of said icons and said item represented thereby.

5. The method of claim 1 wherein said command comprises a delete command and said performing comprises:

deleting said items represented by said at least one of said icons; and subsequent to said deleting, altering an appearance of each of said at least one of said icons to indicate to said user that said icon and said item represented thereby have been deleted.

6. The method of claim 5 further comprising subsequent to said altering, responsive to user selection of one of said at least one of said icons, dealtering said user-selected one of said icons and reinstalling said item represented thereby.

7. The method of claim 1 wherein a first one of said items comprises a setup utility and a second one of said items comprises an executable file, the method further comprising automatically executing said setup utility prior to execution of said executable file.

8. The method of claim 1 wherein said contextual information defines an appearance of said window and of said icons.

9. The method of claim 8 wherein at least one of said icons is a different size, shape or color than the remainder of said icons.

10. A method of operating a computer comprising a graphical user interface (GUI) and a display, the method comprising:

installing on said computer a plurality of related items comprising data files and application programs, said installed items collectively comprising a suite;

storing in a storage element associated with said suite contextual information relating to said installed items individually and collectively, said contextual information comprising information for identifying a location of each of said files and defining a relationship among said items;

responsive to user selection of a graphical display element (GDE) associated with said suite, displaying on said display a window for representing said suite, wherein said installed items are represented in said window by icons;

detecting user selection of at least one of said icons;

responsive to receipt of a move command in connection with said at least one icon, moving said selected ones of said at least one of said icons and said items represented thereby to a location indicated by said user;

responsive to receipt of a copy command in connection with said at least one of said icons, copying said at least one of said icons and said items represented thereby to a location indicated by said user;

responsive to receipt of a delete command in connection with said at least one of said icons, deleting said items represented by said at least one of said icons.

11. The method of claim 10 further comprising, subsequent to said deleting, altering an appearance of said at least one of said icons to indicate to said user that said at least one of said icons and said items represented thereby have been deleted.

12. The method of claim 11 further comprising, subsequent to said altering:

detecting user selection of one of said at least one of said icons; and prompting said user to reinstall said item represented by said selected one of said at least one of said icons.

13. The method of claim 10 wherein at least one of said items comprises a setup utility, the method further comprising requiring said user to activate an icon representing said setup utility before activating any other one of said icons.

14. The method of claim 10 wherein said contextual information defines an appearance of said window and of said icons.

15. The method of claim 14 wherein at least one of said icons is a different size, shape or color than the remainder of said icons.

16. The method of claim 10 wherein one of said icons represents a software suite.

17. A method of operating a computer comprising a graphical user interface (GUI) and a display, the method comprising:

representing at least one item installed on said computer by a graphical display element (GDE);

responsive to receipt of a delete command in connection with at said least one GDE, deleting said at least one item represented by said GDE and subsequent to said deleting, altering an appearance of said GDE to indicate to said user that said GDE and said at least one item represented thereby have been deleted.

18. The method of claim 17 further comprising, subsequent to said altering, responsive to user selection of said GDE, dealtering said GDE and reinstalling said at least one item represented thereby.

19. In a computer comprising a graphical user interface (GUI) and a display, a system for manipulating files installed on said computer, the system comprising:

means for installing on said computer a plurality of related items comprising data files and application programs, said installed items collectively comprising a suite;

a storage element associated with said suite for storing contextual information relating to said installed items individually and collectively, said contextual information comprising information for identifying a location of each of said files and defining a relationship among said items;

means responsive to user selection of a graphical display element (GDE) associated with said suite for displaying on said display a window for representing said suite, wherein each of said installed items is represented in said window by an icon; and means responsive to receipt of a command in connection with at least one of said icons for performing an action identified by said command on each of said at least one of said icons and said installed item represented thereby.

20. The system of claim 19 wherein said command comprises a move command and said means for performing comprises means for moving each of said at least one of said icons and said item represented thereby to a location in said GUI designated by said user.

21. The system of claim 19 wherein said command comprises a copy command and said means for performing comprises means for copying each of said at least one of said icons and said item represented thereby to a location in said GUI designated by said user.

22. The system of claim 19 wherein said command comprises a delete command and said means for performing comprises means for deleting each of said at least one of said icons and said item represented thereby.

23. The system of claim 22 further comprising means for altering an appearance of each of said at least one of said icons to indicate to said user that said icon and said item represented thereby have been deleted.

24. The system of claim 23 further comprising means responsive to user selection of one of said at least one of said icons for dealtering said user-selected one of said icons and reinstalling said item represented thereby.

25. The system of claim 19 wherein a first one of said items comprises a setup utility and a second one of said items comprises an executable file, the system further comprising means for automatically executing said setup utility prior to execution of said executable file.

26. The system of claim 19 wherein said contextual information defines an appearance of said window and of said icons.

27. The system of claim 26 wherein at least one of said icons is a different size, shape or color than the remainder of said icons.

28. An intelligent graphical user interface ("GUI") system for a computer comprising a display, the system comprising:

a suite window for presentation on said display, said suite window being associated with a suite of related files and comprising a plurality of icons for representing said files;

a storage element associated with said suite for storing contextual information relating to said files individually and collectively said contextual information comprising information for identifying a location of each of said files and defining a relationship among said items;

a graphical display element ("GDE") associated with said suite; and wherein responsive to user selection of said GDE, said suite window is displayed on said display in accordance with said contextual information; and wherein responsive to receipt of a command in connection with at least one of said icons, an action identified by said command is performed on each of said at least one of said icons and said files represented thereby.

29. The system of claim 28 wherein said command comprises a move command and wherein responsive to receipt of said move command, each of said at least one of said icons and said files represented thereby are moved to a location designated by said user.

30. The system of claim 28 wherein said command comprises a copy command and wherein responsive to receipt of said copy command, each of said at least one of said icons and said files represented thereby are copied to a location designated by said user.

31. The system of claim 28 wherein said command comprises a delete command and wherein responsive to receipt of said delete command, said files represented by said at least one of said icons are deleted.

32. The system of claim 31 wherein each of said icons comprises a first state for representing an installed file and a second state for representing a deleted file and wherein responsive to receipt of said delete command, each of said at least one of said icons are displayed in said second state.

33. The system of claim 28 wherein said contextual information defines an appearance of said window and of said icons.

34. The system of claim 33 wherein at least one of said icons is a different size, shape or color than the remainder of said icons.

35. In a computer comprising a display, a system for manipulating files installed on said computer, the system comprising:

a graphical display element (GDE) for representing at least one item installed on said computer display; and means responsive to receipt of a delete command in connection with at said least one GDE, for deleting said at least one item represented by said GDE and subsequent to said deleting, for altering an appearance of said GDE to indicate to said user that said GDE and said at least one item represented thereby have been deleted.

36. The system of claim 35 further comprising means responsive to user selection of said GDE for subsequently dealtering said GDE and reinstalling said at least one item represented thereby.

* * * * *